US007620893B2

(12) United States Patent  
Forstmann et al.

(10) Patent No.: US 7,620,893 B2  
(45) Date of Patent: Nov. 17, 2009

(54) AIDING A USER IN USING A SOFTWARE APPLICATION

(75) Inventors: Gerd Forstmann, Nussloch (DE); Carsten Heuer, Schriesheim (DE)

(73) Assignee: SAP AG, Walldorf (DE)

( * ) Notice: Subject to any disclaimer, the term of this patent is extended or adjusted under 35 U.S.C. 154(b) by 701 days.

(21) Appl. No.: 10/814,835

(22) Filed: Mar. 31, 2004

(65) Prior Publication Data

US 2005/0223355 A1 Oct. 6, 2005

(51) Int. Cl.  
  *G06F 3/00* (2006.01)
(52) U.S. Cl. .................. 715/705; 715/709; 715/780; 715/221; 715/222; 715/223; 715/274; 717/105; 717/106; 717/109; 717/110; 717/113; 717/115
(58) Field of Classification Search ................ 715/500, 715/501.1, 513, 705, 709, 712, 713, 221, 715/222, 223, 274, 780; 717/105, 106, 109, 717/110, 113, 115  
See application file for complete search history.

(56) References Cited

U.S. PATENT DOCUMENTS

| 5,890,175 | A | 3/1999 | Wong et al. |
| 6,031,625 | A | 2/2000 | Sherman et al. |
| 7,000,182 | B1 * | 2/2006 | Iremonger et al. ........ 715/517 |
| 2002/0133488 | A1 | 9/2002 | Bellis et al. |
| 2002/0152189 | A1 | 10/2002 | Crim |
| 2003/0025732 | A1 | 2/2003 | Prichard |
| 2004/0003341 | A1 * | 1/2004 | alSafadi et al. ........... 715/500 |
| 2004/0205707 | A1 * | 10/2004 | Kothari et al. ........... 717/113 |

FOREIGN PATENT DOCUMENTS

| EP | 1280055 A1 | 1/2003 |
| WO | WO 0188703 A1 * | 11/2001 |

OTHER PUBLICATIONS

Pages available under the heading, "Create the report," in Crystal Reports Online Help, available from Seagate Software IMG Holdings, Inc., Mk:@MSITStore:C:\unzipped\CR8.5HELP_En\En\crw.chm::/04_quick11.html, printed on Mar. 31, 2004, 19 pages.

Screenshots from Crystal Reports 8.5, printed on Mar. 31, 2004, 11 pages.

"Personalized Reporting with Oracle Developer Release 6i", *An Oracle Technical White Paper*, Apr. 2000.

* cited by examiner

*Primary Examiner*—Weilun Lo  
*Assistant Examiner*—Rashedul Hassan  
(74) *Attorney, Agent, or Firm*—Mintz, Levin, Cohn, Ferris, Glovsky and Popeo, P.C.

(57) ABSTRACT

A method of aiding a user in using features of a software application comprises receiving from a user a selection of layout. The layout is to be used in creating an informational display for displaying results of a data repository query. At least one input field and an image are displayed to the user. The image is of a sample informational display that is based on the selected layout. The at least one input field is displayed in association with at least one feature shown in the displayed sample image. A user input is received via the input field. The user input is to be used in modifying the at least one feature in the new informational display. That least one input field may be displayed on top of the displayed sample image, in close proximity to the shown feature.

18 Claims, 6 Drawing Sheets

AIDING A USER IN USING A SOFTWARE APPLICATION

TECHNICAL FIELD

The following description relates to aiding a user in using features of a software application.

BACKGROUND

In today's business organizations, it is often necessary to overview snapshots of the running data pertaining to the organization. For example, a large corporation with a complex sales organization, advanced inventory management system and a sophisticated production management system needs to monitor certain key values and parameters that indicate the overall status of the operation. The underlying data volumes are typically processed in a computer system, and there is need to extract the relevant information without delay. Organizations therefore typically rely on computerized knowledge management applications to convey the operational status of the company's activities. The knowledge management application can output the requested data in one or more of a collection of informational displays. Each informational display may have a particular visual format that is selected for the specific kind of data to be displayed. The informational display used for presenting the data is sometimes referred to as a business report, because it may be akin to a traditional paper based business report.

A modern business report is commonly constructed in a complex design tool where visual elements like charts, tables, headers and footer sections and user interaction elements like checkboxes, filter dropdown boxes etc. are arranged on the output area. In an additional step the elements are then bound to the data. The steps may occur in reverse order, starting with data selection subsequently screen elements are arranged. Commonly this process requires expert knowledge of the design tool and the functionality of the individual elements. It may be possible to create a report by copying an existing report, if the user can identify and locate the relevant parameter(s) to be altered in the complex report among the parameters which should be left unchanged.

SUMMARY

The systems and techniques described here relate to aiding a user in using a feature of a software application.

In a first general aspect, a method comprises receiving from a user a selection of a layout to be used in generating an informational display for presenting results of a data repository query. At least one input field and an image of a sample informational display that is based on the selected layout are displayed to the user. The at least one input field is displayed in association with at least one feature shown in the displayed sample image. User input to be used in modifying the at least one one feature in the informational display is received via the at least one input field.

In selected embodiments, the at least one input field and the displayed sample image are part of a guided process comprising multiple input fields and displayed sample images. The guided process may be selected from a plurality of guided processes based on the selected layout.

In certain embodiments, the at least one input field is bound to a code portion in the informational display such that the user input can be used in modifying the at least one feature in the informational display. The binding may comprise using an XPATH statement. Using the XPATH statement may comprise generating a new node in the informational display if the new node is specified by the XPATH statement and does not yet exist in the informational display.

In a second general aspect, a method comprises receiving from a user a selection of a template file to be used in creating a new informational display for presenting results of a data repository query. The template file is based on a layout. At least one user-changeable code portion is extracted from the template file according to the layout. The code portion is placed in an XML file. A guided process for modifying the XML file is performed. The guided process involves displaying to the user at least one input field and an image of a sample informational display that is based on the layout. The at least one input field is displayed on top of the displayed image in close proximity to a feature shown in the displayed sample image. User input is received via the at least one input field. The XML file is modified using the user input. The new informational display is created using the XML file.

In a third general aspect, a graphical user interface for aiding a user in using features of a software application comprises a displayed image and at least one input field. The displayed image is of a sample informational display that is based on a layout selected by a user to be used in creating an informational display. The at least one input field is displayed in association with at least one feature shown in the displayed sample image. A user input made via the input field is to be used in modifying the at least one feature in the informational display. Systems and techniques described here may provide any or all of the following advantages. Improved aiding of a user in using a feature of a software application. Improved generation of an informational display. Providing convenient editing by users who are not experts in using a design tool. Allowing user modification of an informational display while keeping certain aspects thereof non-user changeable.

The details of one or more embodiments are set forth in the accompanying drawings and the description below. Other features and advantages will be apparent from the description and drawings, and from the claims.

BRIEF DESCRIPTION OF THE DRAWINGS

Like reference numbers in the various drawings indicate like elements.

DETAILED DESCRIPTION

Figure 1:
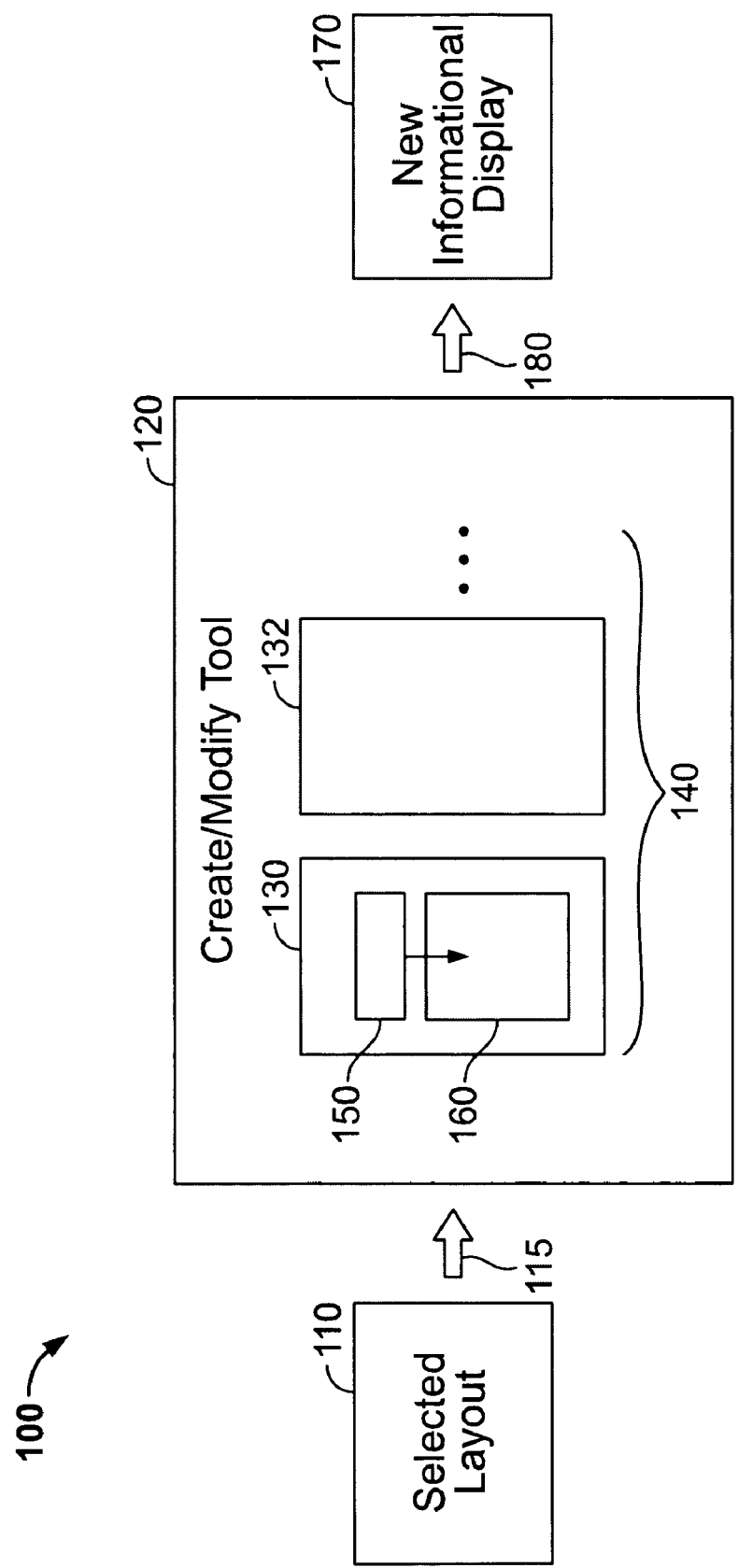
FIGS. 1 and 2 conceptually illustrate aiding a user in using a feature of a software application.

FIG. 1 conceptually illustrates an operation 100 of creating an informational display to be displayed in a graphical user interface. The process 100 begins at the left of FIG. 1, with a user selecting a layout 110 to be used in creating a new informational display. Arrow 115 illustrates that the selected layout 110 is provided to a create/modify tool 120. For example, the tool 120 is implemented by executable code in a software application program. The tool 120 may provide a convenient way for the user to customize user changeable features of the selected layout 110. Particularly, the tool 120 may provide that a dialog step 130 is displayed to the user on a display device. The tool 120 may display multiple dialog steps 130, 132, . . . , in sequence, so as to provide a guided process that "walks" the user through features that can be customized. Accordingly, the guided process consisting of the individual dialog steps may be referred to as a dialog sequence 140, and there may be several such sequences to choose between in the tool 120.

Dialog step 130 includes an input field 150 and an image 160 of a sample informational display that is based on the selected layout 110. The input field 150 may be used to modify a feature in the selected layout 110 such that the modified feature is included in a new informational display 170 that is generated as an outcome of process 100. The input field 150 is displayed in association with at least feature shown in the displayed sample image 160. This may help the user understand what aspect of the selected layout 110 can be modified using the input field 150. In the illustrative dialog step 130, an arrow pointing from the input field 150 to a feature shown in the displayed image 160 highlights the association for the user. Accordingly, the user can make a desired input in the field 150, for example by selecting between alternatives in a drop down list box, and the received user input may be used in creating the new informational display 170.

The feature shown in the display image 160 may relate to a title to be used for the new informational display 170, selection of a data repository query to be provided in the informational display 170, or selection of a filter value that can be used for filtering results of a data repository query. Whether or not the user inputs anything in field 150, the dialog sequence 140 may then proceed with dialog step 132 and any other dialog steps that are part of the sequence.

After the dialog sequence 140 is complete, the new informational display 170 is output by the tool 120 as illustrated by arrow 180. The new informational display 170 includes any user modifications made in the various steps of dialog sequence 140. Accordingly, the new informational display 170 is based on the selected layout 110 and may include user-specific modifications.

Figure 2:
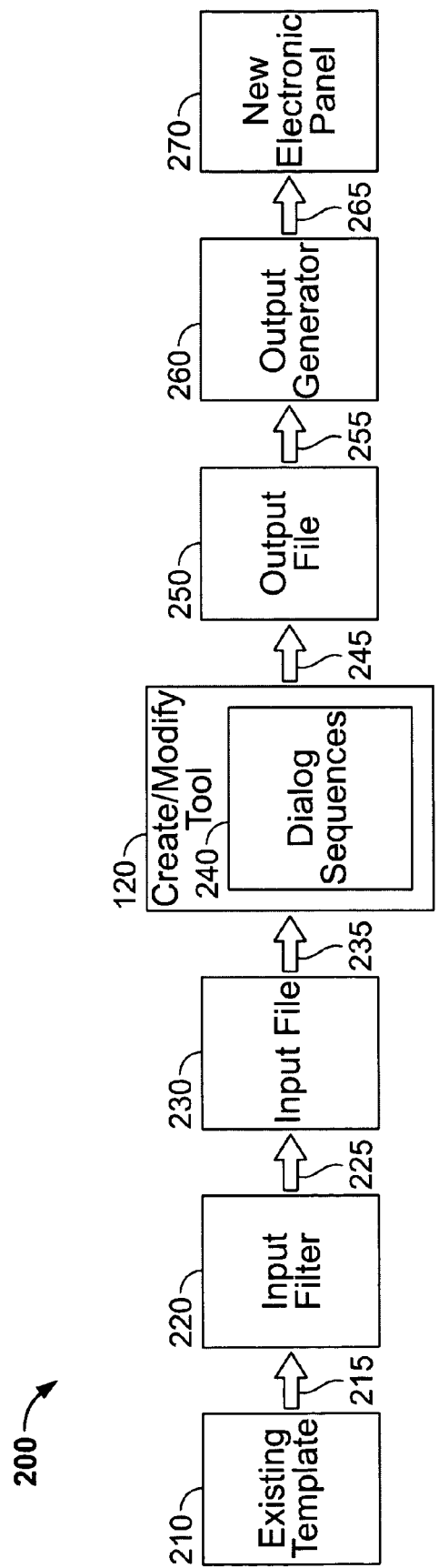

FIG. 2 conceptually shows a process 200 of aiding a user in using a feature of a software application. The process begins, at the left, with the user selecting an existing template 210. The user selects the existing template 210 because it has a layout that the user wants a new informational display to be based on. For example, the existing template 210 is based on the layout 110. The existing template 210 may be an informational display that can be displayed in a graphical user interface similarly to the new informational display to be created. That is, the existing template 210 may be an informational display that has been previously created using the tool 120.

The selected template 210 is passed, as indicated by arrow 215, to an input filter 220, which may be implemented as executable code. The input filter 220 is configured to recognize the layout 110 on which the template 210 is based, and extract user changeable code portions for that layout. For example, it may be desirable to let users customize some substantive features of existing informational displays, such as their titles and the particular data repository queries that they operate with. However, one may wish to preserve the overall design or visual appearance of the informational display, to provide consistency among several informational displays used in the same system. It may therefore be desirable to not let the user customize features such as background colors, borders, font size, and other visual aspects of the layout. The input filter 220 therefore identifies code portions corresponding to user changeable features and, as indicated by arrow 225, places these code portions in an input file 230 for possible user modification. One advantage of the input file 230 is that it can be used to isolate the user changeable code portions from the code corresponding to layout features that are not user changeable, thereby reducing the risk that unwanted changes are made in the layout of the new informational display. In some implementations, the input file 230 is a file using Extensible Markup Language (XML) code. As indicated by arrow 235, the input file 230 is provided to the create/modify tool 120.

Similarly to the process 100, the tool 120 may perform a dialog sequence in which the user can modify one or more aspects of the informational display. The tool 120 may include multiple dialog sequences 240, one of which is to be selected for processing the particular input file 230. For example, one of the dialog sequences 240, such as the dialog sequence 140, may be associated with the particular selected layout 110, and therefore be selected when operating on a template that is based on that particular layout. The selected dialog sequence may cause at least one input field and an image of a sample informational display to be displayed, substantially as described above. During the guided process, the user can enter desired information in the input fields, guided by the association between the input field and the particular layout feature that is being added. That is, one advantage of the tool 120 may be that the user can directly see what aspect of the informational display the input field modifies, which may simplify the user's task of creating the desired new informational display.

The displayed input field is bound to the user changeable code portion of input file 230 that it modifies. That is, the user input made with the displayed field will cause a corresponding change in the contents of the user changeable code, such that the desired change is effective in the new informational display. In some implementations, the binding between the input field and the input file 230 is provided using an XPATH statement. Particularly, the XPATH statement may identify a node in a structure of the input file 230 where the user-entered information is to be incorporated. In some implementations, the XPATH statement is used such that, if the specified node does not exist in the input file 230, perhaps because the user specified feature did not exist in the template 210, that node is created in input file 230 upon executing the XPATH statement. One advantage of such technique is that the tool 120 can be used to introduce new features in the informational display that are not present in the template 210. For example, an XPATH statement can be viewed as a sequence of node addresses that forms the address of an individual node in the node tree. Executable code can be used to parse the XPATH statement and break it up into an address sequence. In so doing, the address sequence is traversed in an attempt to locate the corresponding node in the document. If it is found, the node can be located. If it is not found, the executable code causes the corresponding node to be created in the document. The code may then continue in a similar way with the next address, and so on, until a final node is located or created.

Upon completing the selected dialog sequence, the tool 120, as indicated by arrow 245, generates an output file 250. For example, when the user executes a "save" command in the tool 120, the output file 250 is generated. The tool 120 may cause the modified input file 230 to be stored under a different name that indicates completion of the dialog sequence. As another example, the contents of the modified input file 230 may be stored in a different file. The output file 250 may be an XML file. The output file 250 is forwarded, as indicated by arrow 255, to an output generator 260. The output generator 260 is addressed with the name of the output file 250 and a designated name for the new informational display that is to be generated by the output generator 260. Particularly, the output generator 260 may insert the non-user changeable code portions that were previously removed when creating input file 230. Accordingly, as illustrated by arrow 265, the output generator 260 generates a new informational display 270. For example, the output generator 260 is implemented as executable code in an application program. In some implementations, the output generator 260 may be a command line driven program that uses an XSLT transformation. The new informational display 270 is based on the layout of the selected existing template 210, and includes any user modifications entered during the dialog sequence in tool 120.

Figure 3A:
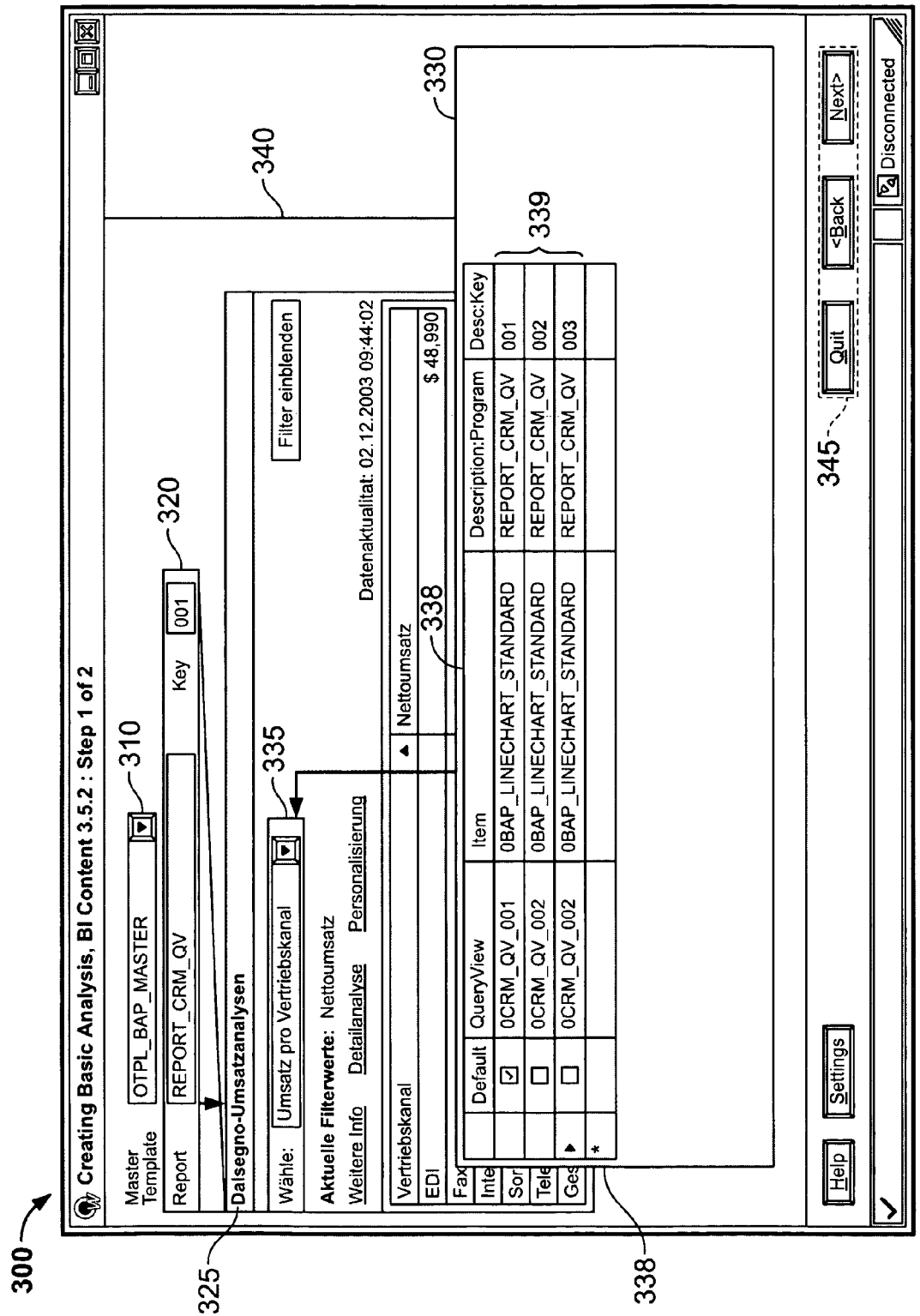
FIGS. 3A and 3B are examples of dialog steps.
Figure 3B:
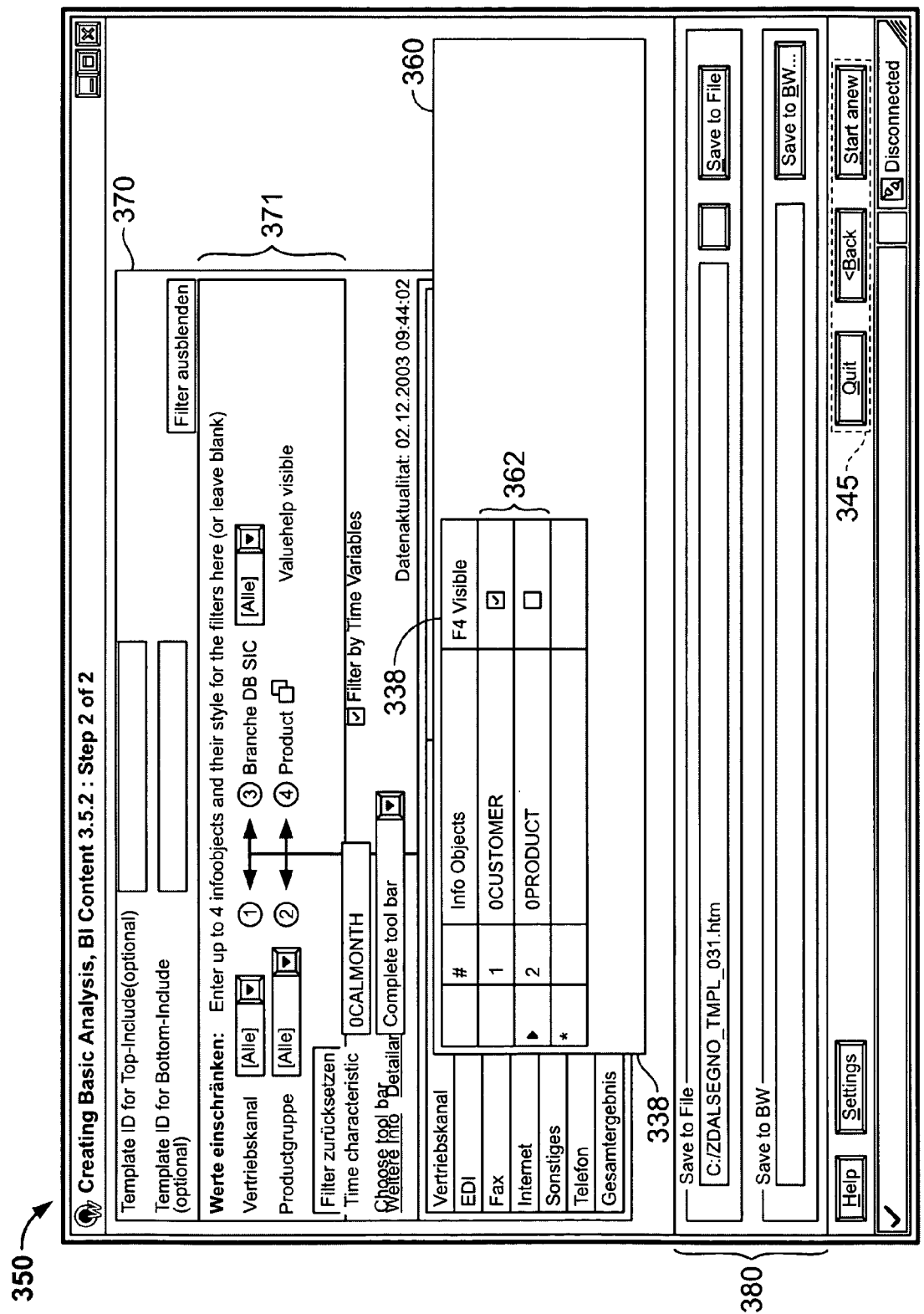

Examples of dialog steps that can be included in one or more of the dialog sequences 240 will now be described with reference to FIGS. 3A and 3B. In dialog step 300, input fields 310, 320 and 330, and a sample image 340, are displayed. The input fields 310-330 are displayed in association with features shown in the displayed sample image 340. Input field 310 is labeled "Master Template" and identifies one of multiple possible visual formats for the selected layout. Input field 320 is displayed in association with a title 325 of the sample image 340. Accordingly, the user can enter a title for the new informational display using input field 320. The input field 320 in this exemplary implementation is displayed on top of the displayed image 340, in close proximity to the title 325, which is the feature that can be modified with the input field. A frame around the input field 320, and an arrow pointing to the title 325, give further visual indications of the association between the input field and the shown feature.

Input field 330 can be used to modify contents of a query selector 335. That is, input field 330 lets the user add or remove pre-existing queries in the selector 335. Borders 338 may be added around part of the input field 330 to distinguish it from the displayed sample image 340. In this example, the input field 330 is displayed partially on top of the sample image 340, in close proximity to the query selector 335 that can be modified. Moreover, an arrow points from the input field to the selector to further guide the users modification. In this example, input field 330 lists three illustrative queries 339 that are currently selected for the query selector 335. Accordingly, if the user moves forward in the dialog sequence and ultimately saves the present values, the new informational display will be created with the queries 339 available in the query selector 335. The user can navigate between dialog steps using navigation buttons 345.

Assume that the user selects the "Next" button among navigation buttons 345. The create/modify tool 120 may then display the next dialog step, if there is one. In this example, the next dialog step 350 appears as shown in FIG. 3B. Here, dialog step 350 includes an input field 360 and a displayed sample image 370. The displayed sample image 370 is of a sample informational display. Particularly, this exemplary image 370 shows a different configuration of the informational display that was pictured with the previous sample image 340. Here, the input field 360 is displayed partially on top of the displayed image 370, and the added borders 338 may help distinguish the two for the user. The input field 360 relates to a filter 371 of the displayed image 370. When the filter function 371 is no longer displayed, the informational display pictured by image 370 may return to an appearance similar to the one shown by image 340. The input field 360 lets the user select one or more filter criteria 362 to be provided in the new informational display. That is, the input field lets the user customize filter values that can subsequently be used in parsing query results using the new informational display.

In this example, dialog step 350 is the second and final step of the dialog sequence, and it therefore includes a saving area 380 in which the user can chose to save the entered modifications. After the user has saved the changes, the tool 120 may proceed by generating the new informational display, as illustrated in process 100 above. Particularly, as illustrated in the process 200 above, the tool 120 may generate an output file that is subsequently passed to an output generator for creating the new informational display.

Figure 4:
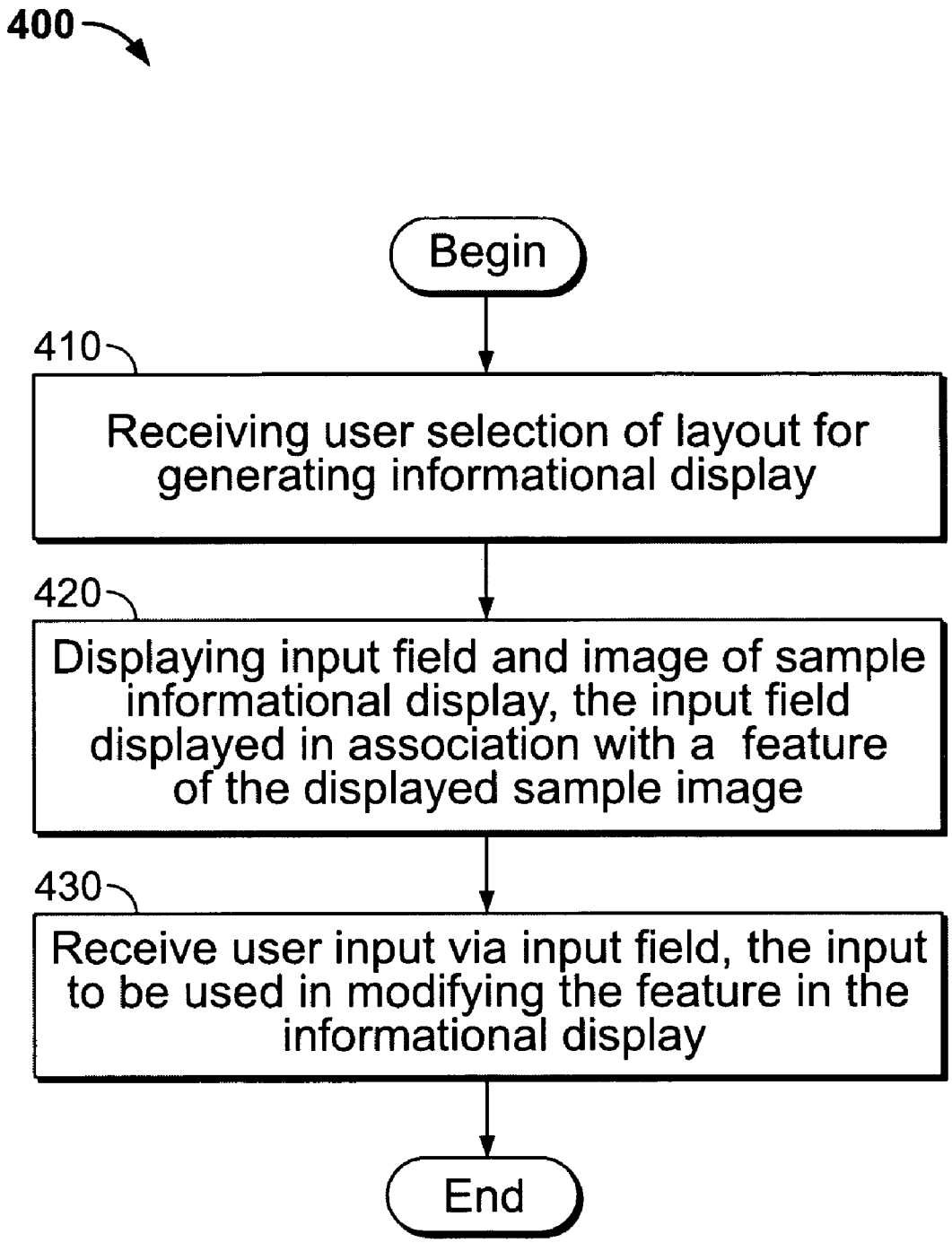
FIG. 4 is a flow chart of a method of aiding a user in a feature of a software application.

FIG. 4 is a flow chart of a method 400 of aiding a user in using a feature of a software application. Preferably, the method 400 is performed in a computer system. For example, a computer program product can include instructions that cause a processor to perform the steps of the method 400. Method 400 includes the following steps:

Receiving from a user, in step 410, a selection of a layout to be used in creating an informational display for displaying results of a data repository query. For example, the user may select the layout 110 as illustrated in process 100. As another example, the user may select an existing template 210, which may be an informational display previously generated by the create/modify tool 120, as illustrated in process 200 above.

Displaying to the user, in step 420 at least one input field and an image. The image is of a sample informational display that is based on the selected layout. The at least one input field is displayed in association with at least one feature shown in the displayed sample image. For example, the input fields 310,320,330 or 360 can be displayed in a graphical user interface. For example, the sample images 340 or 370 can be displayed with the input fields. As yet another example, the input fields can be displayed on top of the displayed image, in close proximity to a feature that they modify.

Receiving via the at least one input field, in step 430, a user input to be used in modifying the at least one feature in the informational display. For example, the input made using input field 330 can be used in modifying the data repository query that is to be provided in the informational display. As another example, the input made via input field 360 can be used in modifying the filter values that are provided in the informational display.

Figure 5:
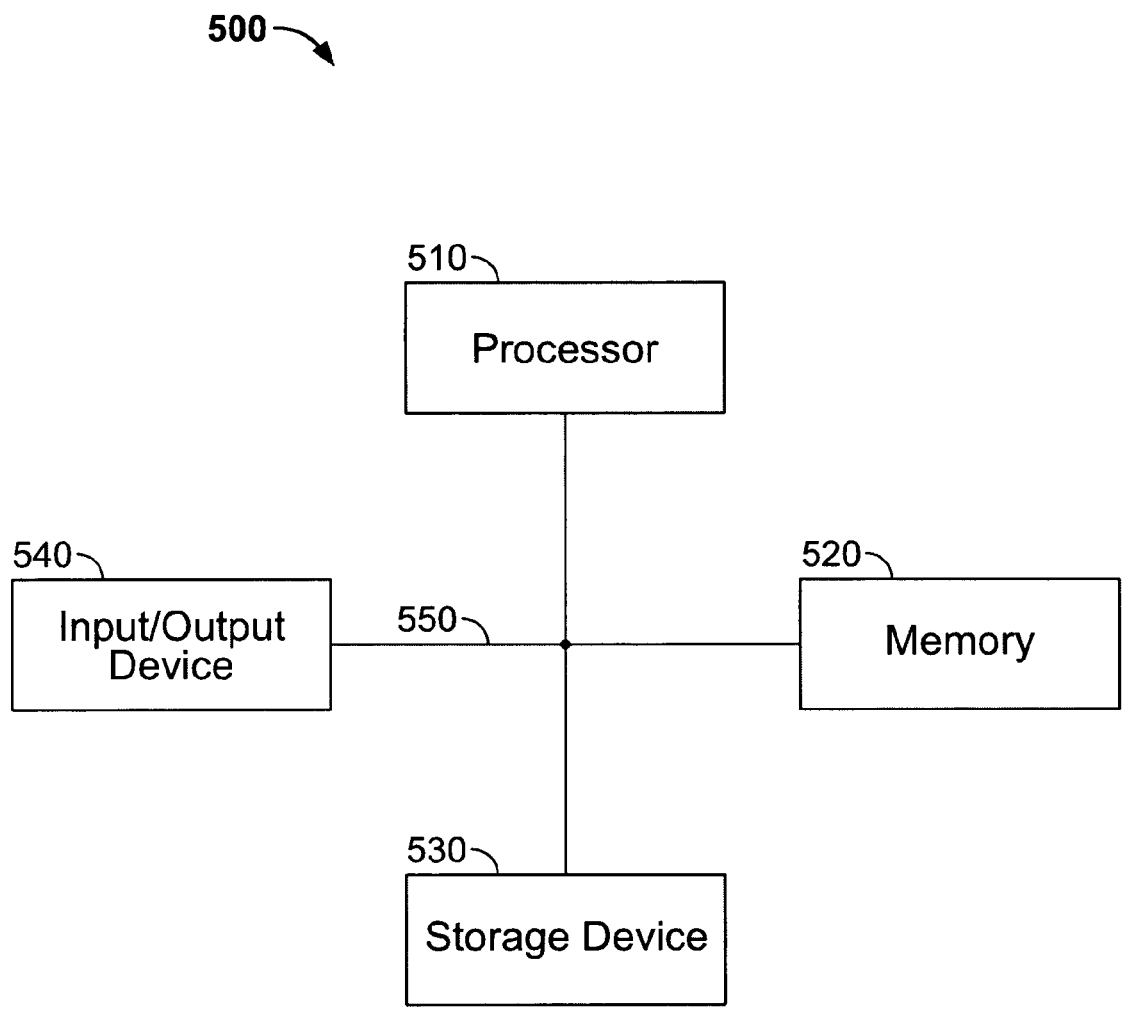
FIG. 5 is a block diagram of a computer system for aiding a user in a feature of a software application.

FIG. 5 is a block diagram of a computer system 500 that can be used in the operations described above, according to one embodiment. The system 500 includes a processor 510, a memory 520, a storage device 530 and an input/output device 540. Each of the components 510, 520, 530 and 540 are interconnected using a system bus 550.

The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530, including for receiving or sending information through the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces. For example, a dialog sequence 240 may be displayed, and user input in response thereto received, via input/output device 540.

The systems and techniques described here can be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions by operating on input data and generating output. The described systems and techniques can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the described systems and techniques can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The systems and techniques described here can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Other embodiments are within the scope of the following claims.

What is claimed is:

1. A method of aiding a user in using features of a software application, the method comprising:
    receiving from a user a selection of a layout to be used in generating an informational display for presenting results of a data repository query, wherein the user selects the layout by selecting an existing informational display on which the informational display is to be based;
    extracting, using a filter, at least one user-changeable code portion from the existing informational display by placing the at least one user-changeable code portion in a file, wherein at least one input field is bound, using an XPATH statement, to the extracted code portion, the filter recognizing the at least one user-changeable code portion from another code portion corresponding to a feature of the layout not changeable by the user, the file isolating the at least one user-changeable code portion from the other portion which is not changeable by the user, the user-changeable code portion corresponding to at least one feature of the layout configured to allow changes by the user, the binding performed using the XPATH statement to generate a new node in the informational display if the new node is specified by the XPATH statement and does not yet exist in the informational display;
    displaying to the user the at least one input field and an image of a sample informational display that is based on the selected layout, the at least one input field being displayed in association with at least one feature shown in the displayed sample image; and
    receiving via the at least one input field user input to be used in modifying the at least one feature in the informational display.

2. The method of claim 1, further comprising placing the extracted code portion in an XML file that is to be modified using the user input, and subsequently using the XML file in creating the new informational display.

3. The method of claim 2, wherein creating the informational display comprises adding non user-changeable code portions to the XML file.

4. The method of claim 1, wherein the at least one input field and the displayed sample image are part of a guided process comprising multiple input fields and displayed sample images.

5. The method of claim 4, wherein the guided process is selected from a plurality of guided processes based on the selected layout.

6. The method of claim 4, wherein at least two of the multiple displayed sample images correspond to different configurations of the informational display.

7. The method of claim 1, wherein the user input is at least one selected from the group consisting of: selection of a title for the informational display, selection of the data repository query to be provided in the informational display, selection of at least one filter value for filtering the results of the data repository query, and combinations thereof.

8. The method of claim 1, wherein the at least one input field is a drop-down list box with multiple user-selectable inputs.

9. The method of claim 1, wherein displaying the input field in association with the feature comprises displaying the input field on top of the displayed sample image in close proximity to the feature.

10. The method of claim 1, further comprising binding the at least one input field to a code portion in the informational display such that the user input can be used in modifying the at least one feature in the informational display.

11. The method of claim 10, wherein binding the at least one input field to the code portion comprises using an XPATH statement, and wherein using the XPATH statement comprises generating a new node in the informational display if the new node is specified by the XPATH statement and does not yet exist in the informational display.

12. A computer program product tangibly embodied in a machine-readable storage device, the computer program product including instructions that, when executed, cause a processor to perform operations comprising:
receive from a user a selection of a layout to be used in generating an informational display for presenting results of a data repository query, wherein the user selects the layout by selecting an existing informational display on which the informational display is to be based;
extract, using a filter, at least one user-changeable code portion from the existing informational display by placing the at least one user-changeable code portion in a file, wherein at least one input field is bound, using an XPATH statement, to the extracted code portion, the filter recognizing the at least one user-changeable code portion from another code portion corresponding to a feature of the layout not changeable by the user, the file isolating the at least one user-changeable code portion from the other portion which is not changeable by the user, the user-changeable code portion corresponding to at least one feature of the layout configured to allow changes by the user, the binding performed using the XPATH statement to generate a new node in the informational display if the new node is specified by the XPATH statement and does not yet exist in the informational display;
display to the user the at least one input field and an image of a sample informational display that is based on the selected layout, the at least one input field being displayed in association with at least one feature shown in the displayed sample image; and
receive via the at least one input field user input to be used in modifying the at least one feature in the informational display.

13. A method of aiding a user in using features of a software application, the method comprising:
receiving from a user a selection of a template file to be used in creating a new informational display for presenting results of a data repository query, the template file being based on a layout;
extracting, using a filter, at least one user-changeable code portion from the template file according to the layout and placing the code portion in an XML file by placing the at least one user-changeable code portion in a file, the filter recognizing the at least one user-changeable code portion from another portion not changeable by the user, the file isolating the at least one user-changeable code portion corresponding to a feature of the layout from the other portion which is not changeable by the user, the user-changeable code portion corresponding to at least one feature of the layout configured to allow changes by the user, the binding performed using the XPATH statement to generate a new node in the informational display if the new node is specified by the XPATH statement and does not yet exist in the informational display;
performing a guided process for modifying the XML file, the guided process involving displaying to the user at least one input field and an image of a sample informational display that is based on the layout, the at least one input field being displayed on top of the displayed image in close proximity to a feature shown in the displayed sample image;
receiving user input via the at least one input field;
modifying the XML file using the user input; and
creating the new informational display using the XML file.

14. The method of claim 13, wherein the guided process is selected from a plurality of guided processes based on the layout of the selected template file.

15. The method of claim 13, wherein modifying the XML file using the user input involves using an XPATH statement to generate a new node in the new informational display if the new node is specified by the XPATH statement and does not yet exist in the new informational display.

16. A computer program product tangibly embodied in a machine-readable storage device, the computer program product including instructions that, when executed, generate on a display device a graphical user interface for aiding a user in using features of a software application, the graphical user interface comprising:
a displayed image of a sample informational display that is based on a layout selected by a user to be used in creating an informational display, wherein the user selects the layout by selecting an existing informational display on which the informational display is to be based and extracting, using a filter, at least one user-changeable code portion from the existing informational display by placing the at least one user-changeable code portion in a file, wherein at least one input field is bound, using an XPATH statement, to the extracted code portion, the filter recognizing the at least one user-changeable code portion from another portion not changeable by the user, the file isolating the at least one user-changeable code portion corresponding to a feature of the layout from the other portion which is not changeable by the user, the user-changeable code portion corresponding to at least one feature of the layout configured to allow changes by the user, the binding performed using the XPATH statement to generate a new node in the informational display if the new node is specified by the XPATH statement and does not yet exist in the informational display; and
at least one input field being displayed in association with at least one feature shown in the displayed sample image, wherein a user input made via the input field is to be used in modifying the at least one feature in the informational display.

17. The computer program product of claim 16, wherein the at least one input field is capable of receiving at least one selected from the group consisting of: selection of a title for the informational display, selection of the data repository query to be provided in the informational display, selection of at least one filter value for filtering the results of the data repository query, and combinations thereof.

18. The computer program product of claim 16, wherein the at least one input field is displayed on top of the displayed sample image in close proximity to the feature.

* * * * *

UNITED STATES PATENT AND TRADEMARK OFFICE
CERTIFICATE OF CORRECTION

PATENT NO. : 7,620,893 B2  Page 1 of 1
APPLICATION NO. : 10/814835
DATED : November 17, 2009
INVENTOR(S) : Forstmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this

Twenty-sixth Day of October, 2010

David J. Kappos
*Director of the United States Patent and Trademark Office*